United States Patent [19]
Alexander et al.

[11] Patent Number: 5,798,855
[45] Date of Patent: Aug. 25, 1998

[54] OPTICAL MONITORING CHANNEL FOR WAVELENGTH DIVISION MULTIPLEXED OPTICAL COMMUNICATION SYSTEM

[75] Inventors: Stephen B. Alexander, Millersville; Steve W. Chaddick; David R. Huber, both of Annapolis, all of Md.

[73] Assignee: Ciena Corporation, Linthicum, Md.

[21] Appl. No.: 672,275

[22] Filed: Jun. 28, 1996

Related U.S. Application Data

[63] Continuation of Ser. No. 457,292, Jun. 1, 1995, Pat. No. 5,532,864.

[51] Int. Cl.$^6$ .................................................. H04B 10/02
[52] U.S. Cl. .................................... 359/177; 359/179
[58] Field of Search ............................ 359/179, 174, 359/176, 177, 173

[56] References Cited

U.S. PATENT DOCUMENTS

| | | | |
|---|---|---|---|
| 4,616,898 | 10/1986 | Hicks, Jr. .................... | 350/96.15 |
| 4,662,715 | 5/1987 | Shutterly .................... | 350/96.16 |
| 4,700,339 | 10/1987 | Gordon et al. ............... | 370/3 |
| 4,709,414 | 11/1987 | So et al. ..................... | 455/607 |
| 4,887,309 | 12/1989 | Anderson et al. ............ | 455/601 |
| 4,972,513 | 11/1990 | Mochizuki et al. .......... | 455/601 |

(List continued on next page.)

FOREIGN PATENT DOCUMENTS

| | | |
|---|---|---|
| 2191645 | 12/1987 | United Kingdom . |
| 2207827 | 2/1989 | United Kingdom . |

OTHER PUBLICATIONS

Gofman, "A Method for Transmitting Service Signals in Fiber–Optic Transmission Systems," *Electrosvyaz*, No. 3, 1988, pp. 38–41.

Ellis et al., *J. Elec. Lett.*, vol. 25, No. 5, 2 March 89, pp. 309–311.

Bjarklev, *Optical Fiber Amplifiers*, (Artech, Boston), c. 1993, pp. 193–232.

Desurvire, *Erbium–Doped Fiber Amplifiers*, (John Wiley, N.Y.) c. 1993.

Gowar, *Opitical Communication Systems*, (Prentice–Hall, N.Y.) c. 1992.

*Primary Examiner*—Wellington Chin
*Assistant Examiner*—Rafael Bacares
*Attorney, Agent, or Firm*—Margaret Burke

[57] ABSTRACT

The present invention provides a wavelength division multiplexed optical communication system which includes an optical monitoring channel which is capable of surviving the failure of an optical amplifier. The optical communication system comprises a plurality of optical transmitters which optically communicate with an optical waveguide which carries the multiplexed optical transmission signal. At least one multiple-stage optical amplifier having at least first and second stages is positioned along said optical waveguide. The optical amplifier includes a first and second stages comprising doped fibers having a first gain wavelength band. An optical connecting element having a plurality of ports is positioned between the first and second stages. At least one of an optical monitoring signal transmitter and an optical monitoring signal receiver optical communicates with at least one port of the optical connecting element such that the optical monitoring signal passes through at least one of the first and second stages of the optical amplifier. The optical monitoring signal wavelength is selected to be greater than the longest wavelength of the first gain wavelength band such that the optical monitoring signal is not substantially attenuated by an unpumped optical amplifier. Therefore, in the event of a pump failure to at least a portion of an optical amplifier, the optical monitoring signal will still be transmitted through the that portion of the amplifier without substantial attenuation. In this manner, a wavelength division multiplexed optical communication system is provided with optical monitoring channels which do not occupy a portion of the amplifier gain spectrum and which can survive the failure of an optical amplifier.

2 Claims, 3 Drawing Sheets

U.S. PATENT DOCUMENTS

| | | | |
|---|---|---|---|
| 4,973,169 | 11/1990 | Sionecker | 350/96.16 |
| 5,054,876 | 10/1991 | Grasso et al. | 385/24 |
| 5,113,459 | 5/1992 | Grasso et al. | 385/24 |
| 5,170,447 | 12/1992 | Heidemann | 385/24 |
| 5,229,876 | 7/1993 | Fatehi et al. | 359/160 |
| 5,285,306 | 2/1994 | Heidemann | 359/160 |
| 5,291,326 | 3/1994 | Heidemann | 359/160 |
| 5,299,048 | 3/1994 | Suyama | 359/179 |
| 5,309,268 | 5/1994 | Nakamura et al. | 359/154 |
| 5,317,439 | 5/1994 | Fatehi et al. | 359/110 |
| 5,383,046 | 1/1995 | Tomofuji et al. | 359/176 |
| 5,394,265 | 2/1995 | Nagel et al. | 359/341 |
| 5,396,360 | 3/1995 | Majima | 359/176 |
| 5,440,418 | 8/1995 | Ishimura et al. | 359/177 |
| 5,455,704 | 10/1995 | Mizuochi et al. | 359/179 |
| 5,461,497 | 10/1995 | Mackichan | 359/179 |
| 5,500,756 | 3/1996 | Tsushima et al. | 359/174 |
| 5,532,864 | 7/1996 | Alexander et al. | 359/177 |
| 5,535,037 | 7/1996 | Yoneyama | 359/177 |
| 5,555,477 | 9/1996 | Tomooka et al. | 359/179 |
| 5,563,731 | 10/1996 | Asahi | 359/177 |

OPTICAL MONITORING CHANNEL FOR WAVELENGTH DIVISION MULTIPLEXED OPTICAL COMMUNICATION SYSTEM

This is a continuation of application Ser. No. 08/457,292, filed Jun. 1, 1995 now U.S. Pat. No. 5,532,864.

FIELD OF THE INVENTION

The invention relates to wavelength division multiplexed optical communication systems and, more particularly, to wavelength division multiplexed optical communication systems having an optical monitoring channel for determining the status of the communication system.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. In a WDM system, plural optical signal channels are carried over a single waveguide, each channel being assigned a particular wavelength. Through the use of optical amplifiers, such as doped fiber amplifiers, plural optical channels are directly amplified simultaneously, facilitating the use of WDM systems in long-distance optical networks.

In order to implement wavelength division multiplexing in practical optical communication systems, it is desirable to include a mechanism for monitoring system performance. To convey monitoring information, e.g., information concerning optical signal characteristics, optical device outputs, service orders, and the like, it is desirable to provide an optical channel within the optical communications system devoted to the monitoring of system performance. Previously, optical communication system designs have concentrated on the provision of service channels for conventional systems which convey their signal payload on a single wavelength. Such a system is disclosed in U.S. Pat. No. 5,113,459. In this patent, an optical fiber transmission line is disclosed which includes units for injecting optical service signals into the line's optical fiber. Similarly, units for extracting optical service signals from the line's optical fiber are provided. In this optical system, the wavelength provided for the telecommunications signals is in the range from 1500 to 1600 nm while the wavelength of the service signal is between 1200 to 1400 nm, preferably 1300 nm. In the '459 optical system, the service channel is supplied/extracted via a connecting unit connected to the input/output of an optical coupler whose output is coupled to the input of an optical amplifier. However, erbium-doped optical fiber amplifiers, as are employed in the '459 system, do not amplify optical transmissions in the 1300 nm wavelength range. Consequently, the optical communication system of the '459 patent provides each optical amplifier with means which diverts the service signals to a path external to the amplifier where they are electrically regenerated following optical-to-electrical conversion. Such regeneration is required when the service channel must travel a substantial distance from the signal origination point since the transmission fiber has an attenuation of approximately 0.35 dB/km in the 1300 nm range. This need to bypass optical amplifiers for regeneration increases system complexity. The high attenuation in the 1300 nm wavelength range also limits the data rate at which the optical signal is launched. The '459 patent describes data rates substantially lower than 300 kbits/sec. While a low rate can transmit conventional alarm on/off indicators, this rate is inadequate for transmission of multimedia information (e .g., voice, data, and video). Additionally, the '459 patent is silent concerning wavelength division multiplexed optical communication systems.

U.S. Pat. No. 5,170,447 also describes a service channel configuration for a conventional optical communication system. In the '447 patent, an optical communication system is disclosed having a transmission signal with a 1540 nm wavelength and a service channel with a 1300 nm wavelength. Couplers are provided in front of or behind an erbium-doped fiber amplifier to couple the 1300 nm channel into the system. As shown in FIGS. 1 and 2, the 1300 nm service channel signal travels away from the doped fiber adjacent the coupler. Again, since 1300 nm signals are not amplified by erbium-doped fiber amplifiers, the 1300 nm signals are not described as passing through the optical amplifiers.

U.S. Pat. No. 5,394,265 describes a telemetry channel in a conventional erbium-doped fiber amplifier system. In the '265 patent, a telemetry signal is supplied to an optical fiber at a carrier wavelength which corresponds to the spontaneous noise peak of a doped fiber amplifier. For erbium-doped fiber amplifiers, this noise peak occurs at 1532 nm. The other signal described as being carried by the optical fiber is a data signal having a wavelength between 1545 and 1560 nm. Although the system described in the '265 patent provides a technique by which telemetry signals can pass through an optical amplifier, the use of an in-band telemetry signal, i.e., a signal at a wavelength which is amplified by erbium-doped fiber amplifiers, is disadvantageous in the event of an amplifier failure. When an erbium-doped fiber amplifier fails, e.g., through a loss of pump light to power the amplifier, the doped fiber attenuates signals in the wavelength band which, when pumped, is the gain region of the amplifier. Therefore, the telemetry signal is attenuated by the doped fiber at a time when it is most needed to report the failure of a system element.

Additionally, the use of an in-band telemetry signal wavelength reduces the number of available wavelengths for use as payload signals. While this loss of spectrum is acceptable in a conventional system, such as the single data signal system described in the '265 patent, the decrease in available spectrum is highly disadvantageous in a wavelength division multiplexed optical communication system. This is particularly true in WDM systems employing many channels, often referred to as "dense" WDM, where channel spacings are on the order of one nanometer or less.

Thus, there is a need in the art for improved wavelength division multiplexed optical communication systems whose system performance can be reliably monitored. In particular, there is a need in the art for wavelength division multiplexed optical communication systems which include one or more optical monitoring channels, especially optical monitoring channels capable of surviving the failure of optical amplifiers.

SUMMARY OF THE INVENTION

The present invention provides a wavelength division multiplexed optical communication system which includes an optical monitoring channel which is capable of surviving the failure of an optical amplifier. The optical communication system comprises a plurality of optical transmitters, each optical transmitter producing an information-bearing optical signal at a transmission wavelength corresponding to an optical channel within the wavelength division multiplexed optical communication system. An optical waveguide optically communicates with each of the optical transmitters for carrying a plurality of wavelength division multiplexed optical transmission signals received from the optical transmitters.

At least one multiple-stage optical amplifier having at least first and second stages is positioned along said optical waveguide for simultaneously amplifying the plurality of wavelength division multiplexed optical transmission signals carried by the waveguide. The optical amplifier includes a first stage comprising a first doped optical fiber having a first end optically communicating with the optical waveguide and a second end optically communicating with an interconnection element. In one embodiment, the fiber is doped with at least one rare-earth-containing material. In particular, rare-earth dopants are selected from erbium, neodymium, praseodymium, ytterbium, and mixtures thereof. For doped fiber amplifiers employing erbium as at least one of the dopants, a first wavelength band between approximately 1500 nm and approximately 1590 nm provides gain to the transmitted optical signals when the doped fiber is pumped. The second stage of the optical amplifier includes a second doped optical fiber having first and second ends, the second end optically communicating with the optical waveguide. The second doped optical fiber is also doped with at least one dopant. In particular, rare-earth dopants such as erbium, neodymium, ytterbium, and praseodymium are selected.

At least one optical pump source optically communicates with the first and second amplifier stages for producing population inversion among the energy levels of the dopant to cause optical amplification of the wavelength division multiplexed optical signals.

An optical connecting element having a plurality of ports is positioned between the first stage and the second stage of the optical amplifier. At least one port optically communicates with the first stage of the optical amplifier while at least a second port optically communicates with the second stage of the optical amplifier.

At least one of an optical monitoring signal transmitter and an optical monitoring signal receiver optically communicates with at least one port of the optical connecting element such that the optical monitoring signal passes through at least one of the first and second stages of the optical amplifier. The optical monitoring signal transmitter transmits an optical monitoring signal having a wavelength greater than the longest wavelength of the first wavelength band of the doped fiber while the optical monitoring signal receiver is configured to receive an optical monitoring signal having a wavelength greater than the longest wavelength of the first wavelength band of the doped fiber. In this manner, the optical monitoring signal wavelength is selected such that the optical monitoring signal is not substantially attenuated by an unpumped optical amplifier. Therefore, in the event of a pump failure or pump interruption to at least a portion of an optical amplifier, optical monitoring signals will still be transmitted in that amplifier portion without substantial attenuation, i.e., attenuation not substantially greater than the attenuation of a conventional, e.g., silica-based, waveguide.

A plurality of optical receiving systems optically communicates with the optical waveguide. Each optical receiving system includes a Bragg grating device for selecting a single optical channel wavelength from the plurality of transmitted wavelength division multiplexed optical signals. In this manner, a wavelength division multiplexed optical communication system is provided with optical monitoring which does not occupy a portion of the amplifier gain spectrum and which can survive the failure of an optical amplifier for transmission to the optical waveguide carrying the multiplexed optical transmission or reception by a monitoring channel receiver.

DETAILED DESCRIPTION

Figure 1:
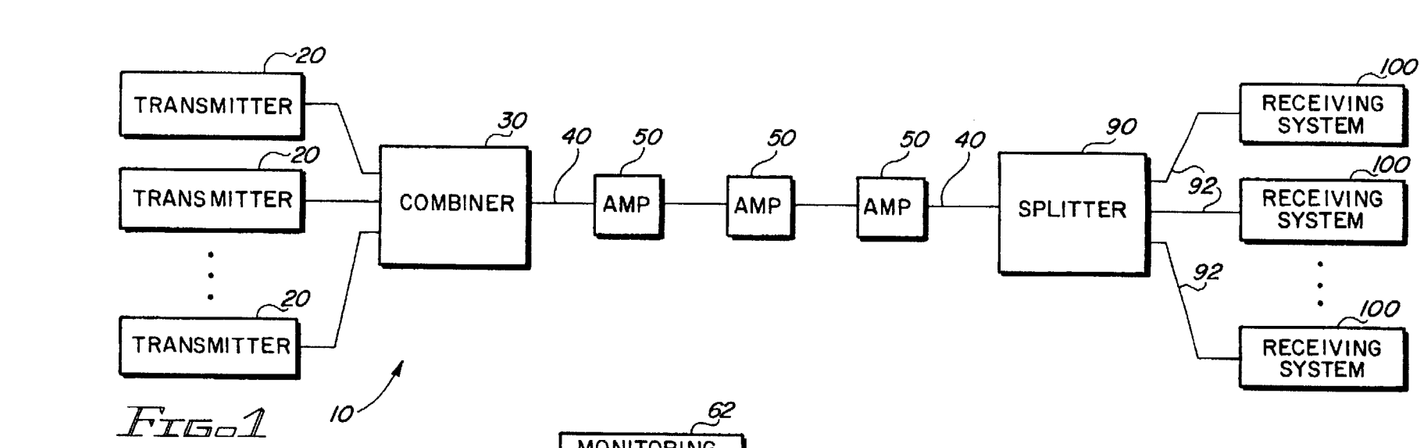
FIG. 1 schematically depicts a wavelength division multiplexed optical communication system according to an embodiment of the present invention.

Turning now to the drawings in detail in which like numerals indicate the same or similar elements in each of the several views, FIG. 1 schematically depicts a wavelength division multiplexed optical communication system 10 according to one embodiment of the present invention. Optical communication system 10 includes a plurality of optical transmitters 20, each optical transmitter emitting an information-bearing optical signal at a transmission wavelength. The expression "information-bearing optical signal," as used herein, refers to an optical signal which has been coded with information, including, but not limited to, audio signals, video signals, and computer data. Each optical transmitter 20 generally includes a laser, such as a DFB semiconductor laser, a laser controller, and a modulator for creation of an information-bearing optical signal. In an exemplary embodiment, the transmitter laser is a DFB semiconductor diode laser, generally comprising one or more III-V semiconductor materials, commercially available from a wide variety of suppliers such as Fujitsu, GEC Marconi, and Hewlett-Packard. The laser outputs an optical carrier signal at a particular channel wavelength corresponding to a demultiplexer wavelength included in a receiving system. The laser controller provides the required laser bias current as well as thermal control of the laser. Using thermal control, the precise operating wavelength of the laser is maintained, typically to within a one angstrom bandwidth.

The optical transmitter further includes a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier is split between the two optical paths. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output optical signal.

Typically, the wavelengths emitted by optical transmitters 20 are selected to be within the 1500 nanometer range, the range in which the minimum signal attenuation occurs for silica-based fibers. More particularly, the wavelengths emitted by the optical transmitters are selected to be in the range from 1540 to 1560 nanometers.

When optical transmitters 20 form Tart of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide. The use of optical remodulators ensures compatibility of optical communication system 10 with currently-deployed transmission equipment. Further description of wavelength division multiplexed optical communication systems with remodulators is found in co-pending U.S. patent application 08/457,292, (Attorney Docket No. 100 mab), the disclosure of which is incorporated by reference herein. Alternatively, the optical transmitters of the present invention can include the transimpedance amplifiers and clock/data recovery schemes depicted in the remodulators of the above-described patent application. Further description of optical transmitters which may be employed in the optical communication systems of the present invention are described in Gowar, *Optical Communication Systems*, incorporated by reference above. Generally, optical amplifiers (not shown) are used to increase the transmitted signal power following modulation.

Each information-bearing optical signal produced by an optical transmitter (or an optical remodulator, if present) constitutes a channel in optical system 10, the wavelength of which corresponds to a demultiplexer wavelength in a receiving system. These optical signal channels are output from transmitters 20 and are brought together in optical combiner 30 for conveyance to optical waveguide 40. Optical combiner 30 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrate Optik GmbH, Waghausel-Kirrlach, Germany, and fused fiber combiners available from Gould, Inc., Millersville, Md. The combination of channels forms a multiplexed optical signal which is output to waveguide 40. Optical waveguide 40 is typically a single-mode optical fiber such as SMF-28, available from Corning, and TRUEWAVE, available from AT&T Corp., and is the principal transmission medium for the optical communication system. However, any optical waveguide which is capable of transporting multiple optical wavelengths can be employed as waveguide 40 in optical system 10.

Interposed along optical waveguide 10 are a plurality of optical amplifiers 50. Optical amplifiers 50 are selected from any device which directly increases the strength of plural optical signals without the need for optical-to-electrical conversion. In general, optical amplifiers 50 are selected from optical waveguides doped with a material which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped. However, when the doped optical fiber is not pumped, e.g., during a pump failure, the fiber is highly absorbing in the same wavelength band. 1500–1590 nm, causing optical signals in this same wavelength band to be attenuated in the amplifier. This creates a drastic change in expected amplifier output signal level in that signals amplified when the amplifier is pumped are dramatically decreased in power level during pump failure. Optical amplifiers, their materials, and their operation are further described in Gowar, Ed. *Optical Communication Systems*, incorporated by reference above. Bjarkley, *Optical Fiber Amplifiers: Design and System Applications*, (Artech House, Norwood, Mass.), c. 1993, the disclosure of which is incorporated herein by reference, and in Desurvire, *Erbium-Doped Fiber Amplifiers*, (John Wiley & Sons. Inc., N.Y.), c. 1994, the disclosure of which is incorporated herein by reference. It is understood that while the invention is described in terms of erbium-doped fiber amplifiers, the invention generally applies to the use of optical monitoring channels at wavelengths outside the gain band of an optical amplifier, regardless of the gain band location or the effect on optical signals when the amplifier is not pumped.

Figure 2:
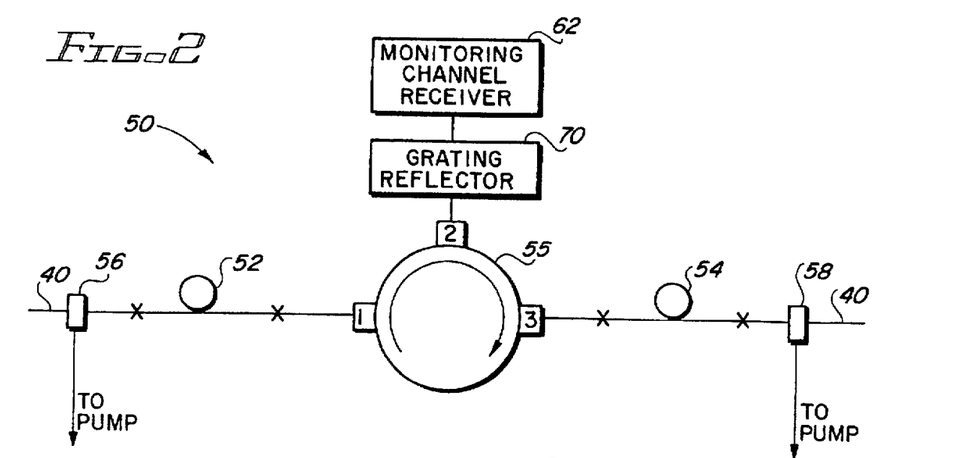
FIG. 2 schematically depicts an amplifier configuration with a monitoring channel receiver for use in the wavelength division multiplexed optical communication system of FIG. 1.

Exemplary optical amplifier configurations for incorporating an optical monitoring channel into the wavelength division multiplexed optical communication system are depicted in FIGS. 2–6. Although FIGS. 2–6 depict optical amplifiers having two stages, it is understood that optical monitoring channels having wavelengths outside the gain band of an optical amplifier are equally useful in single stage optical amplifiers and are included in the present invention. FIG. 2 illustrates a two-stage optical amplifier having first and second sections of erbium-doped fiber. 52 and 54 respectively. The first and second stages of the amplifier optically communicate with each other through an interconnection element. As shown, the interconnection element is selected to be circulator 55 although other optical components such as isolators, filters, and the like may be used to interconnect the amplifier stages. Exemplary optical circulators include those commercially available from JDS-Fitel, Canada, and E-Tek, San Jose, Calif. The depicted circulator comprises three optical ports, the first and third ports connected to doped fiber sections 52 and 54, as shown. In the illustrated three-port configuration. the optical signals input to the first circulator port exit the circulator at the second port. Optical signals input to the second port exit the circulator at the third port. In this manner, optical signals are rotated through the optical circulator in the illustrated circulating direction.

To supply the amplifier stages with pump energy, connecting elements 56 and 58 are provided. These are typically wavelength selective multiplexers which permit pump radiation to enter the doped fiber sections without allowing transmission channel radiation to pass into the pump. Optical pumping elements, not shown, are generally selected from 980 and 1480 nm laser sources. In one embodiment, a 980 nm pump can be used to pump the first stage of the amplifier while a 1480 nm pump is used to pump the second stage of the amplifier. This configuration is described in U.S. Pat. No. 5,140,456. the disclosure of which is incorporated herein by reference. A single laser source, comprising single or multiple laser diodes, can be used to pump both fiber sections or to pump two amplifier stages located in separate optical amplifiers. Alternatively, separate laser sources, having the same or different pumping wavelengths, can be used to pump each fiber section. Further description of amplifier pumping schemes suitable for use in the wavelength division multiplexed optical communication system of the present invention is found in *Optical Fiber Amplifiers*, incorporated by reference above. Although the above-described pumping arrangements are exemplary, any pumping configuration which supplies sufficient power to the optical amplifier stages to create the desired gain can be used in the optical communication systems of the present invention.

The second port of interconnection element 55 is connected to an optical monitoring channel receiver 62 through grating reflector 70. Grating reflector 70 comprises a Bragg diffraction grating or plural Bragg diffraction gratings which reflect the optical channel wavelengths of the wavelength division multiplexed optical communication system. Through the provision of grating reflector 70. the information-bearing optical signals are reflected back towards port 2 of the interconnection element, exiting through port 3. In this manner, amplified spontaneous emission (ASE) created in the first stage of the optical amplifier exits the optical system through port 2 of the circulator, since grating reflector 70 will only reflect the optical system channels back into the optical system. Exemplary grating reflectors and their use in ASE reduction are described in U.S. Pat. No. 5,283,686, the disclosure of which is incorporated herein by reference. Optionally, port 2 may be connected to a gain equalization device for flattening the amplifier gain spectrum across a wavelength band of interest. Exemplary ASE suppression/gain equalization systems are described in co-pending U.S. patent application Ser. Nos. 08/394,340, 08/071,263, 08/367,432, 08/366,472, and 08/366,889 the disclosures of which are incorporated by reference herein. To further decrease ASE and other types of optical noise, optical isolators are optionally positioned before the first amplifier stage and after the second amplifier stage in each of the configurations depicted in FIGS. 2-6. These optical isolators permit signal travel in a single direction. preventing unwanted transmissions and reflections from passing between the optical amplifiers and the transmission waveguide.

In addition to grating reflector 70. the second port of interconnection element 70 optically communicates with at least one of an optical monitoring channel receiver and an optical monitoring channel transmitter. In FIG. 2, the second port communicates with an optical monitoring channel receiver 62 while in FIG. 3 the second port communicates with an optical monitoring channel transmitter 64. In this configuration, optical monitoring signals exit the optical system through circulator port 2 (FIG. 2) or the optical monitoring signals are added through port 2 (FIG. 3), exiting the circulator at port 3 and passing through the second stage of the optical amplifier.

Figure 3:
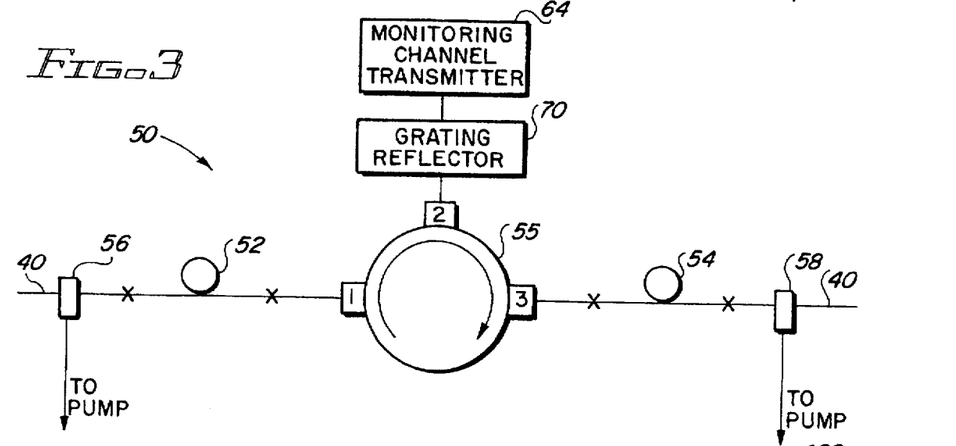
FIG. 3 schematically depicts an amplifier with a monitoring signal transmitter for use in the wavelength division multiplexed optical communication system of FIG. 1.

The optical monitoring channel transmitter 64 emits a monitoring channel at a wavelength outside the gain wavelength band of the doped fiber. Similarly, the optical monitoring channel receiver is configured to receive an optical monitoring channel having a wavelength outside the doped fiber gain wavelength band. In one embodiment, the monitoring channel wavelengths are selected to be longer than the longest wavelength of the gain wavelength band for erbium-doped fiber amplifiers. Exemplary monitoring channel wavelengths are in the 1600 nm wavelength range, with wavelengths of between 1625–1650 nm being preferred and the 1650 nm wavelength being particularly preferred. Wavelengths below the gain wavelength band of erbium-doped fiber amplifiers useful for optical monitoring channels in the communication system of the present invention include those in the low 1400 nm wavelength band, particularly in the range of approximately 1420–1440 nm. Because the optical monitoring channel wavelengths are not within the absorption spectrum of the optical amplifier, the optical monitoring signals will not be substantially attenuated by the optical amplifier in the event of a pump failure.

Advantageously, wavelengths in the range of 1625–1650 nm are attenuated by waveguide 40 at a rate of only approximately 0.18–0.25 dB/km, a figure which is substantially less than that for the service/telemetry channels described in the "Background" section, above. Consequently, the optical monitoring channel of the present invention can travel substantial distances without requiring amplification/regeneration, typically distances on the order of 120–150 km for optical monitoring channels with wavelengths in the 1600 nm range.

The low attenuation for channel wavelengths longer than the gain wavelength band for the amplifier advantageously permits high data rates to be used with the optical monitoring channels. Because the amount of power required per bit of information at a receiver is constant for a given wavelength, high attenuation in the transmission medium at shorter channel wavelengths reduces the data rate which can be transmitted over the optical monitoring channel. At the wavelengths selected for use in the present invention, substantially higher data rates are achieved for the same level of transmitter power than shorter wavelength channels. In particular. data rates of greater than 1 Mbit/sec are easily attainable, with data rates of 1.5 Mbit/sec and 2.0 Mbit/sec being exemplary.

Typically, the optical monitoring channel transmitter includes a laser, laser controller, and modulator similar to the optical transmitters 20, described above. Alternatively, the optical monitoring channel transmitter laser can be directly modulated. In direct modulation, the laser controller is electrically controlled, typically by turning the laser drive current on and off, resulting in an amplitude-modulated output signal. A transimpedance amplifier and clock/data recovery circuitry are optionally positioned before the modulator or before the laser controller in the respective transmitter configurations.

The optical monitoring channel receiver 62 includes a device for converting the received monitoring channel optical signals to electrical signals, such as a photodiode and amplifier. These signals convey a variety of information including information concerning the measured wavelengths and/or strength of the WDM signals, repair and maintenance information, and equipment status information. These uses for the monitoring channel are exemplary; any information which can be transmitted by means of an optical signal can be carried by the optical monitoring channels of the present invention. Receivers suitable for use in the optical communication systems of the present invention include those commercially available from Hewlett-Packard.

When using the amplifier configurations of FIGS. 2 and 3, an optical amplifier communicating with a monitoring channel transmitter is advantageously alternated with an optical amplifier communicating with a monitoring channel receiver, i.e., the embodiment of FIG. 2 is alternated with the embodiment of FIG. 3 in the amplifier array of FIG. 1. In this manner, optical monitoring signals are added and removed at various positions along waveguide 40 in the optical communication system 10.

Figure 4:
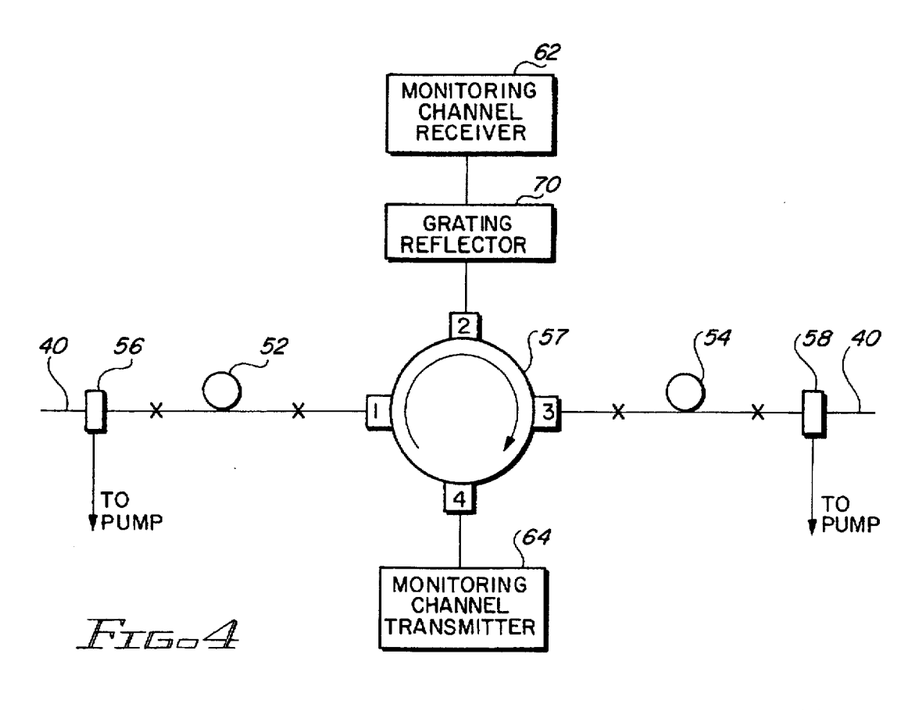
FIG. 4 schematically depicts an amplifier with a monitoring signal transmitter and a monitoring signal receiver for use in the wavelength division multiplexed optical communication system of FIG. 1.

FIG. 4 illustrates an amplifier configuration for both adding and removing monitoring channel signals at a single amplifier. In the FIG. 4 amplifier configuration, a four port circulator 55 is employed. The optical signals are output to adjacent ports in the circulating direction, as in the three port circulator of FIG. 2, beginning with the first port. Additionally, the circulating path is complete in that signals input to the fourth circulator port are output to the first circulator port. The first and third circulator ports respectively communicate with the first and second amplifier stages, as in the three-port circulator embodiment shown in FIG. 2. The second port of the circulator receives the monitoring channel signal through receiver 62, as in the embodiment of FIG. 2. In addition, a monitoring channel transmitter is provided at the fourth port of the optical circulator. Because the signals input at the fourth circulator port exit the circulator at the first port, this configuration provides a mechanism for injecting a monitoring channel to travel upstream in the optical system, i.e., in the direction opposite to the direction of travel of the wavelength division multiplexed signal channels.

Figure 5:
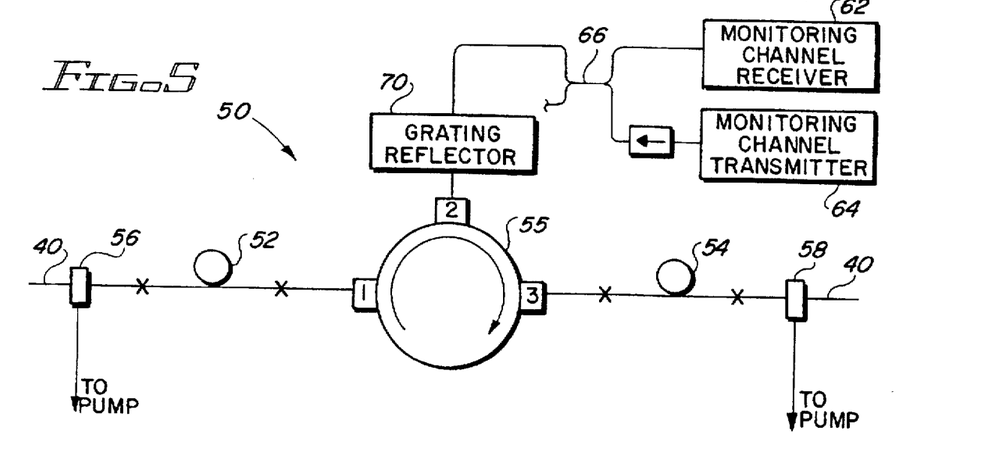
FIG. 5 schematically depicts an amplifier with a monitoring signal transmitter and a monitoring signal receiver for use in the wavelength division multiplexed optical communication system of FIG. 1.

FIG. 5 illustrates an amplifier configuration for both adding and removing monitoring channel signals at a single amplifier. A three port circulator is employed as interconnection element 55 with a grating reflector 70 positioned at the second port as in the embodiments of FIGS. 2 and 3. Beyond grating reflector 70 at circulator port 2 is positioned a directional coupler 66. The monitoring channel receiver communicates with one branch of directional coupler 66 while the monitoring channel transmitter communicates with the other branch of directional coupler 66. An optical isolator 68 is positioned in the branch of the optical splitter which contains the monitoring channel transmitter. In this manner, the optical monitoring signal passes through grating reflector 70 and into receiver 62 through directional coupler 66. The monitoring signal is blocked from entering monitoring channel transmitter 64 by isolator 68 which prevents optical signal propagation towards the transmitter. The transmitted monitoring signal passes to circulator port 3 through circulator port 2 and enters the optical communication system through the second stage of the optical amplifier, propagating in the same direction as the multiplexed optical communication signal.

Alternatively, a second three-port optical circulator can be employed at port 2 of circulator 55, positioned beyond grating reflector 70. The first port is connected to the output of the grating reflector, which circulates this output to the second port, connected to the monitoring channel receiver. An optical monitoring channel transmitter inputs an optical monitoring channel signal to the third port, which outputs the signal at the first port. Through the first port, the optical monitoring channel passes through the grating reflector and into circulator 55 at port 2. This monitoring channel signal is then output to port 3, along with the payload channels reflected by grating reflector 70.

Figure 6:
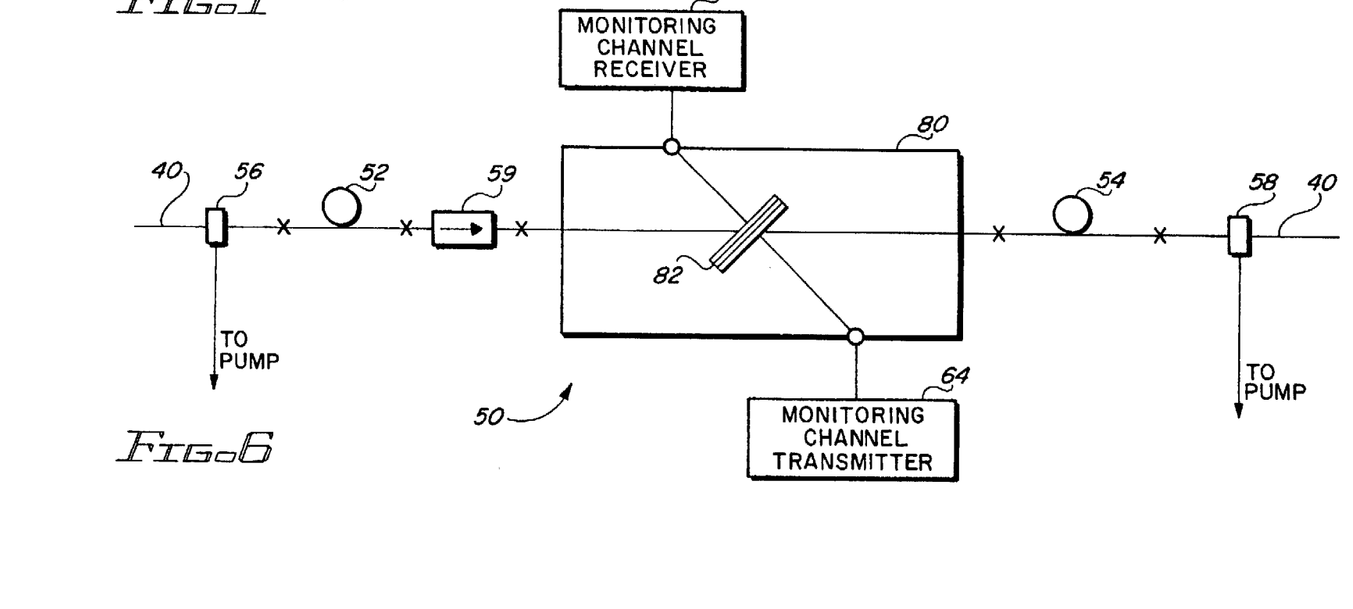
FIG. 6 schematically depicts an amplifier with a monitoring signal transmitter and a monitoring signal receiver for use in the wavelength division multiplexed optical communication system of FIG. 1.

FIG. 6 illustrates a further amplifier configuration in which optical monitoring channels are both injected and removed at a single amplifier location. As in the previous embodiments, amplifier 50 includes first and second doped fiber amplifier stages 52 and 54, and pump connecting elements 56 and 58. To provide ASE noise suppression, isolator 59 is optionally positioned between the first and second amplifier stages. The amplifier stages are interconnected through interconnection element 80, selected to be a four-port wavelength division multiplexer. Multiplexer 80 includes at least one wavelength selective member 82 for selecting one or more optical monitoring channels to enter and exit the communication system. Wavelength selective member 82 can be a multilayer thin film interference filter constructed to reflect an optical monitoring channel having a wavelength outside the gain band of the amplifier.

In an exemplary embodiment, member 82 reflects optical signals having a wavelength of 1650 nm. As such, the incident multiplexed optical signal has the optical monitoring channel wavelength reflected towards monitoring channel receiver 62. Simultaneously, monitoring channel transmitter 64 injects a monitoring channel at 1650 nm wavelength toward wavelength selective member 82 which reflects this channel onto the waveguide in the direction of the second doped fiber 54. The payload optical channels, i.e., those WDM signal channels having wavelengths within the gain band of the optical amplifier, pass through wavelength selective member 82 unaffected. Optionally, additional wavelength selective members can be positioned between member 82 and monitoring channel receiver 62 to reject any portion of the payload optical channel signals which are reflected towards the receiver. Suitable wavelength division multiplexers for use in the optical communication systems of the present invention are commercially available from JDS-Fitel, Inc.

Following transmission and amplification of the multiplexed optical signals along waveguide 40, each channel must be demultiplexed and routed to the receiver designated for the particular channel. The multiplexed signal is input to optical splitter 90 which places a portion of the multiplexed signal onto plural output paths 92. Each output path 92 optically communicates with a receiving system 100. Optical splitter 90 is selected from any optical device which can divide an input optical signal and place it onto plural output paths. Exemplary splitters include passive optical components such as those components described for use as optical combiner 30.

Figure 7:
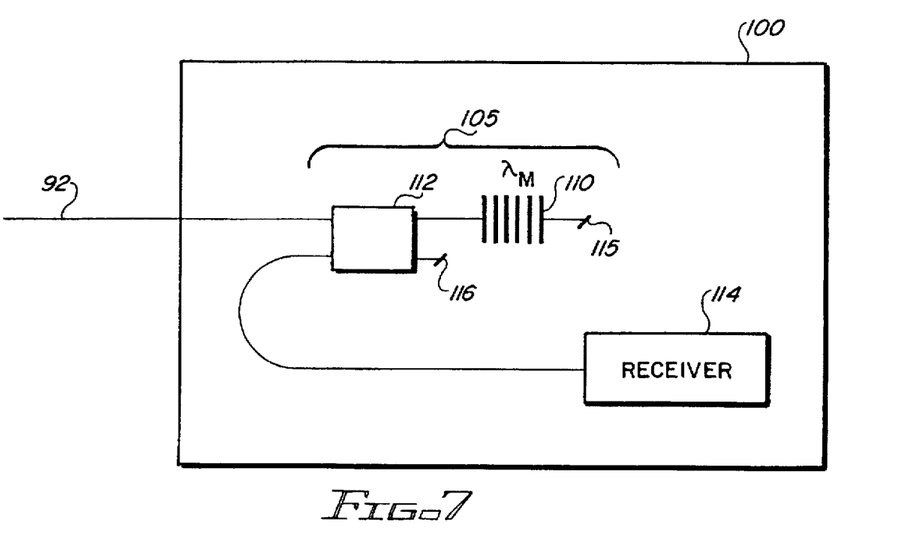
FIG. 7 schematically illustrates a receiving system for use in the wavelength division multiplexed optical communication system of FIG. 1.

FIG. 7 schematically depicts an exemplary receiving system 100 for use in optical communication system 10. Receiving system 100 includes a demultiplexer 105 for selecting the particular channel from the multiplexed signal and outputting the selected channel to the receiver. To perform the channel selection, the multiplexed signal is routed to demultiplexer optical filter 110 through splitter 112. The optical filter passes optical signals having wavelengths other than the channel wavelength to be sent to the receiver. These non-selected channels pass through low reflectivity port 115 and exit the optical communication system. The low reflectivity port 115 is typically an angled fiber cut, although any low reflectivity waveguide termination technique may be employed. The channel wavelength is reflected by optical filter 110 to receiver 114 through splitter 112. The unused optical signals exit splitter 112 through low-reflectivity port 116.

In an exemplary embodiment, the optical filter comprises a Bragg grating member which reflects the channel wavelength and transmits all other wavelengths. Consequently, the channel wavelengths emitted by the remodulators are matched to the reflection wavelengths of the Bragg gratings incorporated in the receiving systems. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein.

The reception channel wavelength is input to receiver 114 through splitter waveguide 113. Optionally, the signal may be optically amplified before it reaches the receiver. Receiver 114 generally detects the optical signal and converts it to an electrical signal, typically through the use of a photodiode device. Various optical receivers suitable for use in optical system 10 are described in Gowar, *Optical Communication Systems*, discussed above.

In optical communication system 10, the receiver will frequently be part of an existing optical communication system to which the reception channel wavelength is routed. Consequently, the optical system 10 can function with numerous types of receivers to ensure compatibility with existing optical equipment.

While the foregoing invention has been described in terms of the embodiments discussed above, numerous variations are possible. For example, the optical communication systems of the present invention can include various combinations of the amplifier monitoring channel configurations depicted in the FIGS. More than one optical monitoring channel at one or more wavelengths can be used in a single communication system. Plural optical communication channels at different wavelengths can be carried simultaneously. Additionally, the topology of the wavelength division multiplexed optical communication system can vary considerably from that depicted in FIG. 1, based upon system requirements. Accordingly, modifications and changes such as those suggested above, but not limited thereto, are considered to be within the scope of following claims.

What is claimed is:

1. A wavelength division multiplexed optical communication system comprising:

a plurality of optical transmitters for creating a plurality of optical transmission signals, each transmission signal having a unique wavelength within the gain band of an optical amplifier;

a plurality of optical receiving systems, each optical receiving system having a wavelength-selecting member for selecting one of the transmission signal wavelengths;

an optical waveguide;

an optical combiner optically communicating with the optical waveguide and with each of the plurality of optical transmitters for combining the plurality of optical transmission signals to create a wavelength division multiplexed optical signal output to the optical waveguide;

an optical splitter optically communicating with the optical waveguide and with the plurality of optical receiving systems, the optical splitter outputting a portion of the multiplexed optical signal to each of the receiving systems;

at least one optical amplifier optically communicating with the optical waveguide for simultaneously amplifying each of the transmission signals of the multiplexed optical signal;

an optical monitoring channel transmitter optically communicating with the optical waveguide for transmitting an information-bearing optical monitoring channel having a wavelength approximately 1600 nm or greater such that the optical monitoring channel is not substantially attenuated by an unpumped optical amplifier.

2. A wavelength division multiplexed optical communication system as recited in claim 1 wherein the data rate of the optical monitoring channel is greater than or equal to 1 Mbit/sec.

* * * * *